United States Patent
Asako

(10) Patent No.: US 10,300,883 B2
(45) Date of Patent: May 28, 2019

(54) PRETENSIONER, RETRACTOR, AND SEAT BELT DEVICE

(71) Applicant: JOYSON SAFETY SYSTEMS JAPAN K.K., Tokyo (JP)

(72) Inventor: Tadayuki Asako, Shiga (JP)

(73) Assignee: JOYSON SAFETY SYSTEMS JAPAN K.K., Tokyo (JP)

( * ) Notice: Subject to any disclaimer, the term of this patent is extended or adjusted under 35 U.S.C. 154(b) by 122 days.

(21) Appl. No.: 15/513,079

(22) PCT Filed: Aug. 24, 2015

(86) PCT No.: PCT/JP2015/073664
§ 371 (c)(1),
(2) Date: Mar. 21, 2017

(87) PCT Pub. No.: WO2016/047338
PCT Pub. Date: Mar. 31, 2016

(65) Prior Publication Data
US 2017/0305386 A1    Oct. 26, 2017

(30) Foreign Application Priority Data
Sep. 22, 2014 (JP) .................. 2014-193064

(51) Int. Cl.
*A47C 31/00*    (2006.01)
*B60R 22/46*    (2006.01)
(Continued)

(52) U.S. Cl.
CPC ...... B60R 22/4633 (2013.01); A44B 11/2561 (2013.01); B60R 22/24 (2013.01);
(Continued)

(58) Field of Classification Search
CPC . B60R 22/24; B60R 22/4633; B60R 22/4628; B60R 2022/468;
(Continued)

(56) References Cited

U.S. PATENT DOCUMENTS 6,419,176 B1 * 7/2002 Mizuno .............. B60R 22/4628
                                                  242/374
6,532,739 B2 * 3/2003 Kameyoshi ........ B60R 22/4628
                                                  242/374
(Continued)

FOREIGN PATENT DOCUMENTS

DE    10 2009 010 435 A1    9/2010
DE    10 2008 049 931 B4    3/2012
(Continued)

OTHER PUBLICATIONS

European Search Report dated Mar. 20, 2018 in corresponding application No. 15845046.
(Continued)

Primary Examiner — Chi Q Nguyen
(74) Attorney, Agent, or Firm — Foley & Lardner LLP

(57) ABSTRACT

Provided are a pretensioner, a retractor, and a seat belt device that can effectively reduce kinetic energy of an injected power transmission member. A power transmission unit includes a power transmission member that is engageable with external teeth of the ring gear, a pipe that contains the power transmission member, a gas generator that is disposed at an end of the pipe, a piston that receives gas generated from the gas generator to press the power transmission member, a first stopper that is disposed on an upstream side of the power transmission member, a second stopper that is disposed between the power transmission member and the piston, and a pretensioner cover that defines a passage for the power transmission member.

3 Claims, 5 Drawing Sheets

(51) Int. Cl.
*A44B 11/25* (2006.01)
*B60R 22/24* (2006.01)

(52) U.S. Cl.
CPC .... *B60R 22/4628* (2013.01); *B60R 2022/468* (2013.01); *B60R 2022/4638* (2013.01); *B60R 2022/4642* (2013.01)

(58) Field of Classification Search
CPC .... B60R 2022/4642; B60R 2022/4638; B60R 22/46; B60R 22/4619; B60R 2022/1806; B60R 2022/4647
USPC .............. 297/475, 474, 476, 479, 478, 480; 280/806; 242/374, 375.3, 379.1
See application file for complete search history.

(56) References Cited

U.S. PATENT DOCUMENTS

| | | | |
|---|---|---|---|
| 7,631,831 B2* | 12/2009 | Hiramatsu | B60R 22/4628 |
| | | | 242/374 |
| 8,262,059 B2 | 9/2012 | Dolenti et al. | |
| 8,473,162 B2 | 6/2013 | Jabusch | |
| 8,523,140 B2 | 9/2013 | Dolenti et al. | |
| 8,529,398 B2 | 9/2013 | Jabusch | |
| 8,641,097 B2* | 2/2014 | Hodatsu | B60R 22/4628 |
| | | | 280/806 |
| 8,678,509 B2* | 3/2014 | Shiotani | B60R 22/4633 |
| | | | 242/374 |
| 9,242,617 B2 | 1/2016 | Singer et al. | |
| 9,327,681 B2 | 5/2016 | Singer et al. | |
| 9,487,184 B2 | 11/2016 | Jabusch | |
| 2001/0040199 A1* | 11/2001 | Takehara | B60R 22/4628 |
| | | | 242/374 |
| 2002/0053621 A1* | 5/2002 | Shiotani | B60R 22/4628 |
| | | | 242/374 |
| 2003/0029953 A1 | 2/2003 | Matsumura | |
| 2005/0133330 A1 | 6/2005 | Stiefvater | |
| 2007/0262186 A1* | 11/2007 | Hiramatsu | B60R 22/4628 |
| | | | 242/374 |
| 2009/0222171 A1 | 9/2009 | Jabusch | |
| 2009/0302246 A1 | 12/2009 | Dolenti et al. | |
| 2010/0066150 A1* | 3/2010 | Mori | B60R 22/46 |
| | | | 297/475 |
| 2010/0276531 A1* | 11/2010 | Shiotani | B60R 22/4628 |
| | | | 242/374 |
| 2011/0140502 A1* | 6/2011 | Shiotani | B60R 22/4633 |
| | | | 297/475 |
| 2011/0172054 A1 | 7/2011 | Jabusch | |
| 2012/0256407 A1* | 10/2012 | Tomita | B60R 22/4628 |
| | | | 280/806 |
| 2013/0001033 A1 | 1/2013 | Dolenti et al. | |
| 2013/0038047 A1* | 2/2013 | Schmidt | B60R 22/4628 |
| | | | 280/806 |
| 2013/0140391 A1 | 6/2013 | Jabusch | |
| 2013/0320127 A1 | 12/2013 | Singer et al. | |
| 2014/0014758 A1 | 1/2014 | Gentner et al. | |
| 2015/0083841 A1 | 3/2015 | Singer et al. | |
| 2015/0203070 A1 | 7/2015 | Singer et al. | |
| 2015/0298926 A1 | 10/2015 | Okubo et al. | |
| 2016/0229375 A1 | 8/2016 | Jabusch et al. | |

FOREIGN PATENT DOCUMENTS

| | | |
|---|---|---|
| DE | 10 2011 008 405 A1 | 7/2012 |
| DE | 10 2011 101 481 A1 | 11/2012 |
| DE | 10 2011 101 517 A1 | 11/2012 |
| DE | 10 2011 101 518 A1 | 11/2012 |
| DE | 10 2011 114 572 A1 | 4/2013 |
| DE | 10 2011 101 516 B4 | 7/2013 |
| DE | 10 2012 010 918 A1 | 12/2013 |
| DE | 10 2010 026 285 B4 | 2/2014 |
| DE | 10 2010 050 189 B4 | 3/2014 |
| DE | 10 2012 214 521 B4 | 3/2014 |
| DE | 10 2013 001 375 A1 | 7/2014 |
| DE | 10 2011 089 203 B4 | 8/2014 |
| DE | 10 2011 101 515 B4 | 8/2014 |
| DE | 10 2013 203 286 A1 | 8/2014 |
| DE | 10 2014 202 498 B3 | 3/2015 |
| DE | 10 2013 220 949 A1 | 4/2015 |
| EP | 1 854 682 A1 | 11/2007 |
| EP | 1 874 593 B1 | 12/2010 |
| JP | 2003-054363 A | 2/2003 |
| JP | 2007-522030 A | 8/2004 |
| JP | 2013-184538 A | 9/2013 |
| JP | 2014-088108 A | 5/2014 |
| JP | 2014-201156 A | 10/2014 |
| JP | 2015-128925 A | 7/2015 |
| WO | WO-2004/096611 A1 | 11/2004 |
| WO | WO-2005/080150 A1 | 9/2005 |
| WO | WO 2005/080150 A1 | 9/2005 |
| WO | WO-2007/130041 A1 | 11/2007 |
| WO | WO-2010/139433 A1 | 12/2010 |
| WO | WO-2011/077749 A1 | 6/2011 |
| WO | WO-2012/059166 A1 | 5/2012 |
| WO | WO 2012/143090 A1 | 10/2012 |
| WO | WO-2012/156019 A1 | 11/2012 |
| WO | WO-2012/156020 A1 | 11/2012 |
| WO | WO-2013/079150 A1 | 6/2013 |
| WO | WO-2014/087721 A1 | 6/2014 |
| WO | WO-2014/131824 A1 | 9/2014 |
| WO | WO-2015/121159 A1 | 8/2015 |

OTHER PUBLICATIONS

International Search Report issued in International Patent Application No. PCT/JP2015/073664 dated Oct. 6, 2015.

* cited by examiner

PRETENSIONER, RETRACTOR, AND SEAT BELT DEVICE

CROSS-REFERENCE TO RELATED APPLICATIONS

The present application is a U.S. national stage application of International Patent Application No. PCT/JP2015/073664, filed Aug. 24, 2015, which claims the benefit of priority to Japanese Patent Application No. 2014-193064, filed Sep. 22, 2014, the entireties of which are hereby incorporated by reference.

TECHNICAL FIELD

The present invention relates to a pretensioner, a retractor, and a seat belt device, and in particular, relates to a pretensioner, a retractor, and a seat belt device that are suitable for reducing kinetic energy of an injected power transmission member.

BACKGROUND ART

Vehicles such as automobiles generally are provided with seat belt devices for restraining an occupant in a seat that includes a seat portion on which the occupant sits and a backrest portion positioned back of the occupant. Such a seat belt device includes a webbing for restraining the occupant, a retractor for retracting the webbing, a guide anchor that is provided on a vehicle body side and guides the webbing, a belt anchor for fixing the webbing to the vehicle body side, a buckle disposed on a side surface of the seat, and a tongue disposed in the webbing. The tongue is fitted into the buckle to restrain the occupant in the seat with the webbing. In such the seat belt device, a first end of the webbing is fixed to the belt anchor, and a second end of the webbing is inserted into the guide anchor to be connected to the retractor.

It is becoming common that such the retractor has a pretensioner that eliminates slack in the webbing in an emergency such as a vehicle collision (e.g., refer to Patent Literatures 1 and 2). Pretensioners described in Patent Literatures 1 and 2 include a pinion gear coupled to a spool for winding a webbing, a power transmission member (load transmission element) for rotating the pinion gear in a vehicle collision, and a tube (pipe) that contains the power transmission member. The power transmission member described in Patent Literature 1 is a plurality of mass bodies (balls), and the power transmission member described in Patent Literature 2 is a long slender rod member made of a resin.

CITATION LIST

Patent Literature

Patent Literature 1: JP 2007-522030 W
Patent Literature 2: WO 2012/143090 A

SUMMARY OF INVENTION

Technical Problem

A task of the invention described in the Patent Literature 1 mentioned above is to prevent the mass bodies from being completely released from the pipe, and gas in the pipe from being released to external environment. Thus, a shape of the pipe is deformed, there is disposed a gate that can be closed by movement of the mass bodies, and a last mass body is bitten by a pinion gear.

In recent years, however, from the viewpoint of miniaturization and achieving high performance of a device, a gas pressure for driving the power transmission member tends to be higher, and kinetic energy of the injected power transmission member tends to be larger. Therefore, what is needed is a technique for further reducing this kinetic energy.

The present invention is made in view of the above-described problems, and an object of the present invention is to provide a pretensioner, a retractor, and a seat belt device that can effectively reduce kinetic energy of an injected power transmission member.

Solution to Problem

According to the present invention, there is provided a pretensioner including a ring gear to which the spool for winding a webbing that restrains an occupant is rotatably disposed, and a power transmission unit for transmitting power to the ring gear in an emergency, wherein the power transmission unit includes a power transmission member that is engageable with external teeth of the ring gear, a pipe that contains the power transmission member, a gas generator that is disposed at an end of the pipe, a piston that receives gas generated from the gas generator to press the power transmission member, a first stopper that is disposed on an upstream side of the power transmission member, a second stopper that is disposed between the power transmission member and the piston, and a pretensioner cover that defines a passage for the power transmission member.

Additionally, according to the present invention, there is provided a retractor including a spool for winding a webbing that restrains an occupant, and a pretensioner for winding the webbing and eliminating slack in an emergency, wherein the pretensioner includes a ring gear to which the spool is rotatably disposed, and a power transmission unit for transmitting power to the ring gear in an emergency, and the power transmission unit includes a power transmission member that is engageable with external teeth of the ring gear, a pipe that contains the power transmission member, a gas generator that is disposed at an end of the pipe, a piston that receives gas generated from the gas generator to press the power transmission member, a first stopper that is disposed on an upstream side of the power transmission member, a second stopper that is disposed between the power transmission member and the piston, and a pretensioner cover that defines a passage for the power transmission member.

Furthermore, according to the present invention, there is provided a seat belt device including a webbing for restraining an occupant, a retractor for winding the webbing, a belt anchor for fixing the webbing on a vehicle body side, a buckle disposed on a side surface of the seat, and a tongue disposed in the webbing, wherein the retractor includes a spool for winding the webbing that restrains the occupant, and a pretensioner for winding the webbing and eliminating slack in an emergency, the pretensioner includes a ring gear to which the spool is rotatably disposed, and a power transmission unit for transmitting power to the ring gear in an emergency, and the power transmission unit includes a power transmission member that is engageable with external teeth of the ring gear, a pipe that contains the power transmission member, a gas generator that is disposed at an end of the pipe, a piston that receives gas generated from the gas generator to press the power transmission member, a first stopper that is disposed on an upstream side of the power transmission member, a second stopper that is disposed between the power transmission member and the piston, and a pretensioner cover that defines a passage for the power transmission member.

In the above-described pretensioner, retractor, and seat belt device, the first stopper may have a strength capable of absorbing kinetic energy of the power transmission member, and the second stopper may have a strength capable of being bitten by the ring gear to stop rotation.

Additionally, the first stopper may be fixed to a termination of the passage, or may be disposed on a front end of the power transmission member to be movable together with the power transmission member.

Further, the power transmission member may be spherical-shaped metal members, or may be a rod-shaped resin member. Furthermore, the power transmission member is a rod-shaped resin member, and the first stopper may be formed integrally with the power transmission member.

Advantageous Effects of Invention

According to the above-described pretensioner, retractor, and seat belt device of the present invention, the first stopper is disposed on a front side of the power transmission member, and the second stopper is disposed on a rear side of the power transmission member, so that the first stopper can be interposed between the termination of the passage and the injected power transmission member, and the first stopper can primarily absorb the kinetic energy of the power transmission member. Additionally, the second stopper is bitten between the passage and the ring gear, which can prevent the second stopper from being released from the pipe, and can prevent the gas from being released to external environment.

In the present invention, in particular, the second stopper can be operated in a state where the first stopper has reduced the kinetic energy of the power transmission member, which can effectively reduce the kinetic energy of the injected power transmission member, and can also relax design conditions, such as strength, required for the second stopper.

BRIEF DESCRIPTION OF DRAWINGS

FIGS. 1(A) to 1(C) illustrate schematic configurations of a pretensioner according to a first embodiment of the present invention, in which FIG. 1(A) illustrates a normal state, FIG. 1(B) illustrates an injected state, and FIG. 1(C) illustrates an operation-completed state.

FIGS. 2(A) to 2(C) illustrate schematic configurations of a pretensioner according to a second embodiment of the present invention, in which FIG. 2(A) illustrates a normal state, FIG. 2(B) illustrates an injected state, and FIG. 2(C) illustrates an operation-completed state.

FIGS. 3(A) to 3(C) illustrate schematic configurations of a pretensioner according to a third embodiment of the present invention, in which FIG. 3(A) illustrates a normal state, FIG. 3(B) illustrates an injected state, and FIG. 3(C) illustrates an operation-completed state.

DESCRIPTION OF EMBODIMENTS

Figure 1C:
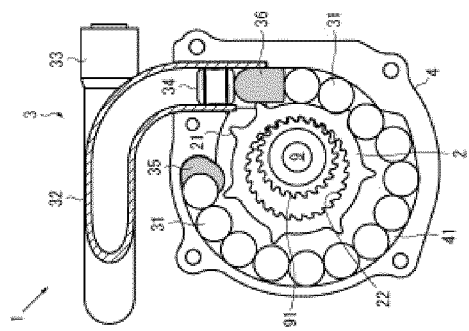
Figure 1B:
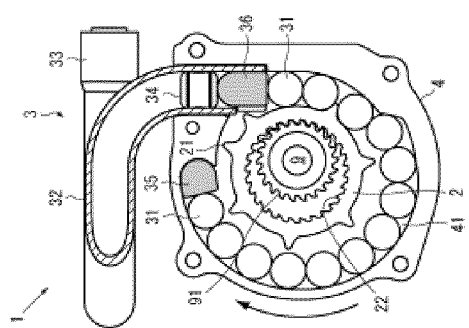
Figure 1A:
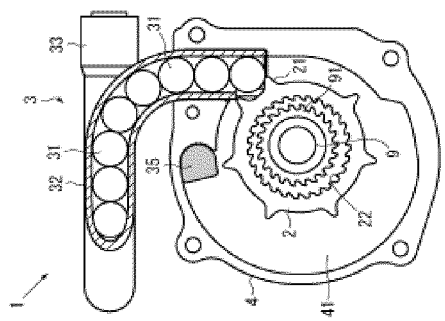
Figure 2C:
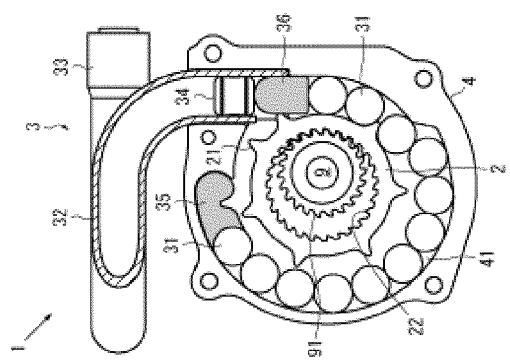
Figure 2B:
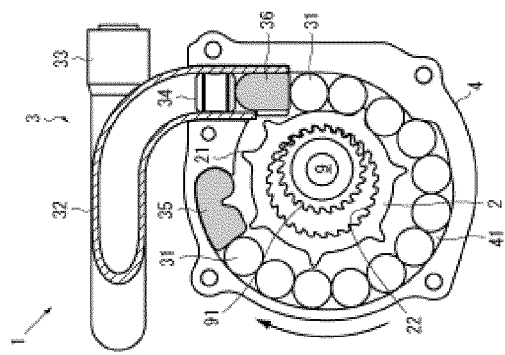
Figure 2A:
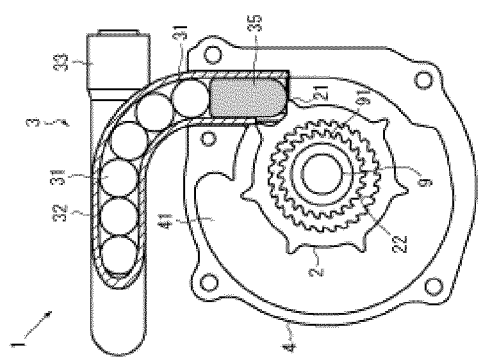
Figure 3C:
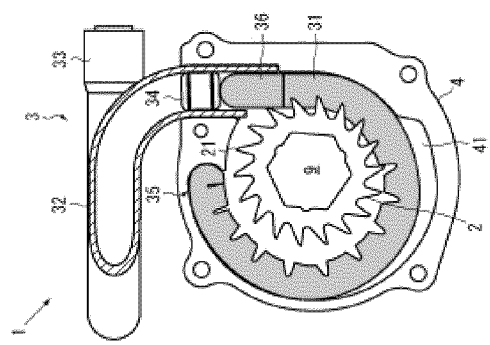
Figure 3B:
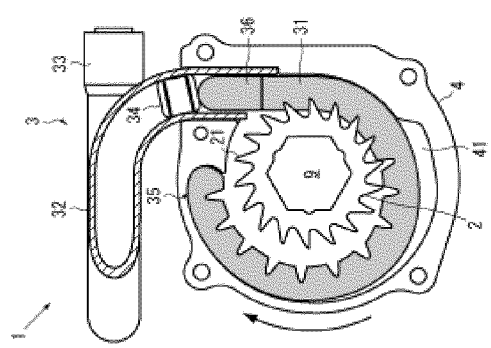
Figure 3A:
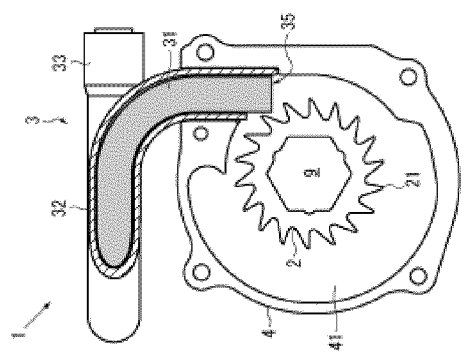

Embodiments of the present invention are described below with reference to FIGS. 1(A) to 5. Here, FIGS. 1(A) to 1(C) illustrate schematic configurations of a pretensioner according to a first embodiment of the present invention, in which FIG. 1(A) illustrates a normal state, FIG. 1(B) illustrates an injected state, and FIG. 1(C) illustrates an operation-completed state. FIGS. 2(A) to 2(C) illustrate schematic configurations of a pretensioner according to a second embodiment of the present invention, in which FIG. 2(A) illustrates a normal state, FIG. 2(B) illustrates an injected state, and FIG. 2(C) illustrates an operation-completed state. FIGS. 3(A) to 3(C) illustrate schematic configurations of a pretensioner according to a third embodiment of the present invention, in which FIG. 3(A) illustrates a normal state, FIG. 3(B) illustrates an injected state, and FIG. 3(C) illustrates an operation-completed state. It should be noted that like reference numerals are given to like components in each of the figures to omit a repeated description.

The pretensioner 1 according to the first embodiment of the invention includes, as illustrated in FIGS. 1(A) to 1(C), a ring gear 2 to which the spool for winding a webbing that restrains an occupant is rotatably disposed, and a power transmission unit 3 for transmitting power to the ring gear 2 in an emergency. The power transmission ring gear 3 includes a power transmission member 31 that is engageable with external teeth 21 of the ring gear 2, a pipe 32 that contains the power transmission member 31, a gas generator 33 that is disposed at an end of the pipe 32, a piston 34 that receives gas generated from the gas generator 33 to press the power transmission member 31, a first stopper 35 that is disposed on an upstream side of the power transmission member 31, a second stopper 36 that is disposed between the power transmission member 31 and the piston 34, and a pretensioner cover 4 that defines a passage 41 for the power transmission member 31.

The pretensioner cover 4 is fixed on a side surface of a base frame that contains the spool, and the pipe 32 is disposed so as to be curved along the base frame. A rotating shaft 9 of the spool is coaxially connected to a pinion gear 91. External teeth formed on an outer circumference of the pinion gear 91 are engageable with internal teeth 22 formed on an inner circumference of the ring gear 2. At normal time, as illustrated in FIG. 1(A), there is provided a clearance between the external teeth of the pinion gear 91 and the internal teeth 22 of the ring gear 2, and the rotating shaft 9 of the spool and the pinion gear 91 are in a rotatable state without interfering with the ring gear 2.

In the first embodiment, the power transmission member 31 is structured, for example, with spherical-shaped metal members (balls). As illustrated in FIG. 1(A), the ring gear 2 is, for example, positioned by the pretensioner cover 4 so as not to interfere with the pinion gear 91 at normal time.

Additionally, as illustrated in FIG. 1(A), the external teeth 21 of the ring gear 2 is formed so as to have a valley that is engageable only with a first ball (power transmission member 31), and valleys that are respectively engageable with two of a second and succeeding balls (power transmission member 31). Furthermore, the ring gear 2 is formed in a circular shape, and there are formed the internal teeth 22, which are engageable with the external teeth of the pinion gear 91, in an inner circumference portion.

As illustrated in FIG. 1(A), a plurality of balls (power transmission member 31) are filled in the pipe 32, and at normal time, are supported by the external teeth 21 of the ring gear 2 so as not to move. In an inside of the pretensioner cover 4, the passage 41 is defined such that the balls (power transmission member 31) can move around an outer circumference of the ring gear 2 along a side wall. Then, the first stopper 35 is fixed to a termination of the passage 41. The first stopper 35 is, for example, formed of a resin member, and has a strength capable of absorbing kinetic energy of injected balls (power transmission member 31) by elastic or plastic deformation.

Additionally, the second stopper 36 is disposed at the tail end of the balls (power transmission member 31) that are contained in the pipe 32, and the piston 34 is disposed on a rear (downstream) side of the second stopper 36 (see FIG. 1(B)). The gas generator 33, such as a micro gas generator, is disposed at a termination of the pipe 32.

In an emergency (e.g., in a collision) of a vehicle equipped with a retractor including the pretensioner 1 described above, an operation signal is sent to the gas generator 33 from a sensor installed on a vehicle body, and high pressure gas is injected into the pipe 32 from the gas generator 33. Due to this high pressure gas, the piston 34 slides in the pipe 32 while being in closely contact with an inner surface of the pipe 32 to prevent leakage of the high pressure gas. Then, the second stopper 36 and the balls (power transmission member 31) are pressed by the slide of the piston 34 to move in the pipe 32.

A first ball (power transmission member 31) pushed out from the pipe 32 presses the ring gear 2 while engaging with the external teeth 21 of the ring gear 2, and the ring gear 2 moves toward the pinion gear 91. As a result, the internal teeth 22 of the ring gear 2 and the external teeth of the pinion gear 91 are engaged, and rotation of the ring gear 2 can rotate the pinion gear 91 and rotate the spool.

Due to the high pressure gas supplied from the gas generator 33, the balls (power transmission member 31) are sequentially released from the pipe 32 to rotate the ring gear 2, and then disengaged from the ring gear 2 to move along the passage 41. As illustrated in FIG. 1(B), a ball (power transmission member 31) that has reached the termination of the passage 41 comes into contact with the first stopper 35. At this time, the second stopper 36 stays at a position where the second stopper 36 is not released from the pipe 32.

Although the ball (power transmission member 31) in contact with the first stopper 35 is pressed by the high pressure gas, the kinetic energy of the balls (power transmission member 31) is absorbed by the elastic or plastic deformation of the first stopper 35. For example, as illustrated in FIG. 1(C), the first stopper 35 is pressed by the balls (power transmission member 31) and absorbs the kinetic energy of the balls (power transmission member 31) while being elastically or plastically deformed. Therefore, a speed of the balls (power transmission member 31) can be reduced by bringing the balls (power transmission member 31) into contact with the first stopper 35.

Then, balls (power transmission member 31), the second stopper 36, and the piston 34 are moved by an amount of deformation of the first stopper 35, and the second stopper 36 is bitten by the ring gear 2, as illustrated in FIG. 1(C). The second stopper 36 is, for example, formed of a metal member or a resin member, and has a strength capable of being bitten by the ring gear 2 to stop rotation of the ring gear 2. It should be noted that the number of balls (power transmission member 31) and a length of the second stopper 36 are adjusted such that the second stopper 36 is not released from the pipe 32 when the second stopper 36 is bitten by the ring gear 2.

According to the pretensioner 1 of the embodiment described above, the first stopper 35 is disposed on a front side (upstream side) of the balls (power transmission member 31), and the second stopper 36 is disposed on a rear side (downstream side) of the balls (power transmission member 31), so that the first stopper 35 can be interposed between the termination of the passage 41 and the injected balls (power transmission member 31), and the first stopper 35 can primarily absorb the kinetic energy of the balls (power transmission member 31).

Additionally, the second stopper 36 is bitten between the passage 41 and the ring gear 2, which can prevent the second stopper 36 from being released from the pipe 32, and can prevent the gas from being released to external environment.

In this embodiment, in particular, the second stopper 36 can be operated in a state where the first stopper 35 has reduced the kinetic energy of the balls (power transmission member 31), which can effectively reduce the kinetic energy of the injected balls (power transmission member 31), and can also relax design conditions, such as strength, required for the second stopper 36.

It should be noted that, in the first embodiment described above, the power transmission member 31 may be a rod-shaped resin member (resin rod). In this case, the first stopper 35 can be deformed when the first stopper 35 has a lower strength than the resin rod, and the resin rod can be deformed when the first stopper 35 has higher strength than the resin rod. In either case, the kinetic energy of the power transmission member 31 (resin rod) can be reduced.

The pretensioner 1 according to the second embodiment illustrated in FIGS. 2(A) to 2(C) has different disposition of a first stopper 35 from the first embodiment described above, but other structures are the same as the first embodiment. As illustrated in FIG. 2(A), the first stopper 35 in the second embodiment is disposed on a front end of the balls (power transmission member 31), and movable together with the balls (power transmission member 31).

Therefore, when the high pressure gas is injected into a pipe 32 from a gas generator 33, the first stopper 35 is pressed by the balls (power transmission member 31) and released from the pipe 32. The first stopper 35 released from the pipe 32 presses a ring gear 2 while engaging with the external teeth 21 of the ring gear 2, and the ring gear 2 moves toward a pinion gear 91. It should be noted that a length of the first stopper 35 is adjusted such that the first stopper 35 is engageable with at least a portion having a narrow valley that is to be engaged with a ball (power transmission member 31).

Then, due to the high pressure gas supplied from the gas generator 33, the balls (power transmission member 31) are sequentially released from the pipe 32 to rotate the ring gear 2, and then the first stopper 35 and the balls (power transmission member 31) move along a passage 41. As illustrated in FIG. 2(B), the first stopper 35 that has reached a termination of the passage 41 is held and pressed between a succeeding ball (power transmission member 31) and the termination of the passage 41, and is deformed to absorb the kinetic energy of the balls (power transmission member 31), as illustrated in FIG. 2(C). Then a second stopper 36 is bitten by the ring gear 2 to stop rotation of the ring gear 2.

Such a second embodiment also has the same effect as the pretensioner 1 according to the first embodiment described above. It should be noted that, also in the second embodiment described above, the power transmission member 31 may be a rod-shaped resin member (resin rod).

The pretensioner 1 according to the third embodiment illustrated in FIGS. 3(A) to 3(C) is made such that a power transmission member 31 is structured with a rod-shaped resin member (resin rod), and a first stopper 35 is formed integrally with the resin rod (power transmission member 31). Namely, a tip part of the resin rod (power transmission member 31) forms the first stopper 35. The resin member of a part forming the first stopper 35 may be made of a same material as the resin rod (power transmission member 31), or a material having a lower strength than that of the resin rod (power transmission member 31).

When the resin rod is adopted as the power transmission member 31, since a ring gear 2 can be rotated by plastic deformation of the resin rod regardless of a phase of the ring gear 2, a clutch mechanism (mechanism for controlling disengagement and engagement between a pinion gear 91 and the ring gear 2) that is adopted in the above-described first embodiment and second embodiment is not required. Thus, a rotating shaft 9 of a spool 11 is coaxially connected to the ring gear 2, as illustrated in FIG. 3(A). A plurality of external teeth 21 are formed at equal intervals on an outer circumference of the ring gear 2. It should be noted that, even when the resin rod is adopted as the power transmission member 31, the same clutch mechanism as that of the above-described first embodiment and second embodiment may be adopted.

When high pressure gas is injected into a pipe 32 from a gas generator 33, the resin rod (power transmission member 31) is pressed and released from the pipe 32. The resin rod (power transmission member 31) released from the pipe 32 engages with the external teeth 21 to rotate the ring gear 2 while being plastically deformed by the external teeth 21 of the ring gear 2.

After rotating the ring gear 2, the resin rod (power transmission member 31) moves along a passage 41. Then, as illustrated in FIG. 3(B), the resin rod (power transmission member 31) that has reached a termination of the passage 41 is pressed against the termination of the passage 41, and as illustrated in FIG. 3(C), the tip part (the part corresponding to the first stopper 35) is plastically deformed to absorb the kinetic energy of the resin rod (power transmission member 31). Then the second stopper 36 is bitten by the ring gear 2 to stop rotation of the ring gear 2. Such a third embodiment also has the same effect as the pretensioner 1 according to the first embodiment described above.

Next, a retractor 10 including the pretensioner 1 according to the third embodiment described above is described below with reference to FIG. 4. Here, FIG. 4 illustrates a developed view of parts of a retractor including the pretensioner according to the third embodiment of the invention.

Figure 4:
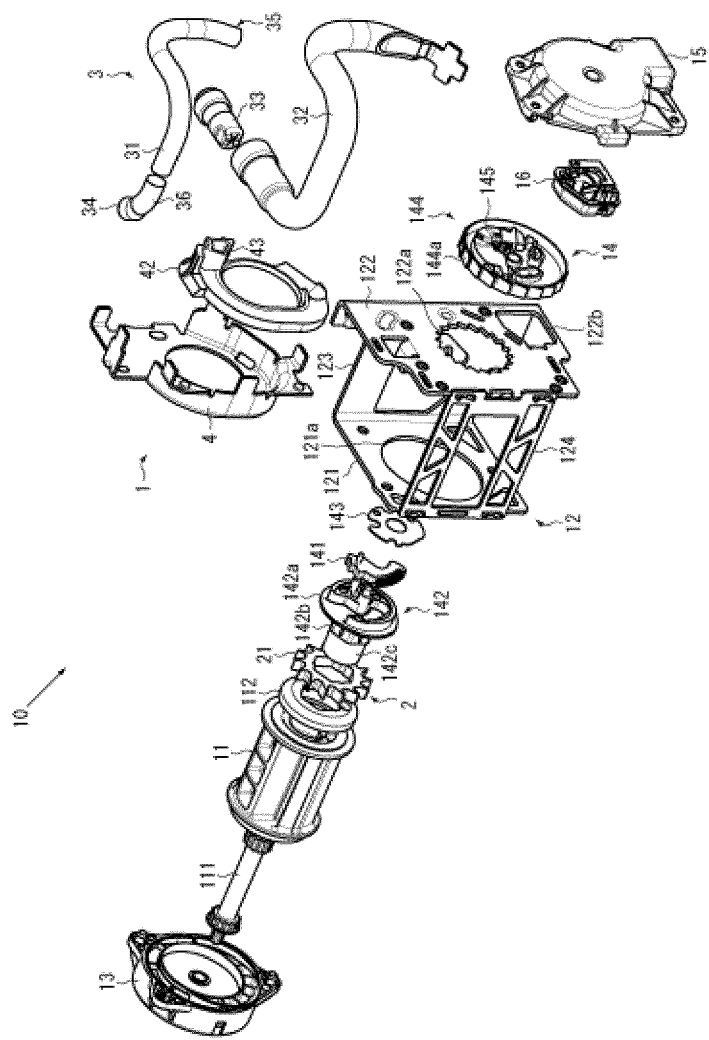
FIG. 4 illustrates a developed view of parts of a retractor including the pretensioner according to the third embodiment of the invention.

The retractor 10 illustrated in FIG. 4 includes a spool 11 for winding a webbing that restrains an occupant, and a pretensioner 1 for winding the webbing and eliminating slack in an emergency. The pretensioner 1 includes a ring gear 2 to which the spool 11 is rotatably disposed, and a power transmission unit 3 for transmitting power to the ring gear 2 in an emergency. The power transmission unit 3 includes a power transmission member 31 that is engageable with external teeth 21 of the ring gear 2, a pipe 32 that contains the power transmission member 31, a gas generator 33 that is disposed at an end of the pipe 32, a piston 34 that receives gas generated from the gas generator 33 to press the power transmission member 31, a first stopper 35 that is formed integrally with the power transmission member 31, a second stopper 36 that is disposed between the power transmission member 31 and the piston 34, and a pretensioner cover 4 that defines a passage 41 for the power transmission member 31. It should be noted that an illustration of the webbing is omitted from FIG. 4.

The spool 11 is a retracting drum that retracts the webbing and is rotatably contained in a base frame 12 that forms a skeleton of the retractor 10. The base frame 12 includes, for example, a pair of opposed end surfaces 121 and 122, and a side surface 123 for connecting these end surfaces. The base frame 12 may include a tie plate 124 that is opposed to the side surface 123 and is connected to the end surfaces 121 and 122. Additionally, for example, a spring unit 13 is disposed on the end surface 121 side, and the pretensioner 1 and a lock mechanism 14 are disposed on the end surface 122 side. It should be noted that dispositions of the spring unit 13, the pretensioner 1, the lock mechanism 14 and the like are not limited to that illustrated.

Additionally, the end surface 121 of the base frame 12 is formed with an opening 121a through which the spool 11 is inserted, and the end surface 122 of the base frame 12 is formed with an opening 122a that has internal teeth engageable with a pawl 141 of the lock mechanism 14. Further, in an inside of the end surface 122 of the base frame 12, a part of the pretensioner 1 (e.g., the ring gear 2 or the like) is disposed. Furthermore, the lock mechanism 14 is disposed at an outside of the end surface 122 of the base frame 12, and the lock mechanism 14 is contained in a retainer cover 15.

The retainer cover 15 may be disposed with a vehicle sensor 16 for detecting sudden deceleration or inclination of a vehicle body. The vehicle sensor 16 includes, for example, a spherical mass body and a sensor lever that is to be swung by a movement of the mass body. The vehicle sensor 16 may be fitted into an opening 122b formed on the end surface 122 of the base frame 12.

The spool 11 includes a cavity in a central portion, through which a torsion bar 111 forming an axis is inserted. An inside of a first end of the torsion bar 111 is connected to an end of the spool 11, and an outside of the first end of the torsion bar 111 is connected to a spring core of the spring unit 13. Therefore, the spool 11 is connected to the spring unit 13 via the torsion bar 111, and is energized in a direction in which the webbing is wound by a power spring housed in the spring unit 13. Although not illustrated, a shaft portion may be formed on an end surface of the spool 11 such that the first end of the torsion bar 111 is connected to an inside of the shaft portion, and the spring unit 13 is connected to an outside of the shaft portion. It should be noted that as a means of applying a retracting force to the spool 11 is not limited to the spring unit 13, but may also be other unit using an electric motor or the like.

Additionally, a second end of the torsion bar 111 is connected to a locking base 142 of the lock mechanism 14. As explained below, the locking base 142 is engageable with the base frame 12, and is capable of switching between a rotating state and a non-rotating state of the torsion bar 111. Therefore, even when subjected to a load in a direction of withdrawing the webbing in an operating state of the lock mechanism 14 (the state the locking base 142 is engaged with the base frame 12), a non-rotating state of the spool 11 can be maintained until a load equal to or more than a threshold value occurs in the torsion bar 111. Then, when the load equal to or more than the threshold value occurs in the torsion bar 111, the torsion bar 111 twists so that the spool 11 generates relative rotational movement to withdraw the webbing.

The lock mechanism 14 includes the locking base 142 that is connected to an end of the torsion bar 111 and capable of switching between a rotating state and a non-rotating state, the pawl 141 swingably disposed in the locking base 142, and a cover plate 143 for regulating a movement of the pawl 141 in an axial direction, a lock gear 144 rotatably disposed at an outside of the locking base 142, a flywheel 145 swingably disposed to the lock gear 144, and the retainer cover 15 for containing these parts and rotatably supporting the locking base 142. It should be noted that the lock mechanism 14 is not limited to that with the structure illustrated, but those with various structures which conventionally exist may be optionally selected and used.

The locking base 142 includes a circular disk part 142a, a ring-gear-supporting part 142b in a substantially hexagonal cylindrical shape that is formed on the spool 11 side of the disk part 142a to support the ring gear 2, and a torsion-bar-supporting part 142c into which a second end of the torsion bar 111 is inserted. Additionally, the ring-gear-supporting part 142b is inserted with a bearing 112 that receives a shaft for the pretensioner cover 4 when the pretensioner 1 is actuated. In the illustrated embodiment, the spool 11, the torsion bar 111, the locking base 142, and the like are coaxially disposed thereby to form a rotating shaft of the spool 11. It should be noted that a shape of the ring-gear-supporting part 142b is not limited to that illustrated. For example, the ring-gear-supporting part 142b may have a saw-tooth shape or other polygonal shapes.

Although an example has been described where the ring gear 2 is fixed to the locking base 142 here, it is not limited to such the structure. For example, as illustrated in FIGS. 1(A) and 2(A), a pinion gear 91 connected to the spool 11 may be inserted through an inside of the ring gear 2 to engage internal teeth of the ring gear 2 with external teeth of the pinion gear 91 as required thereby the rotation of the ring gear 2 is transmitted to the spool 11 via the pinion gear 91.

According to the lock mechanism 14 with the structure described above, when the webbing is faster than a normal speed of withdrawal, that is, acceleration speed of withdrawal of the webbing exceeds a specified threshold value, the flywheel 145 swings and engages with internal teeth (not illustrated) of the retainer cover 15, and rotation of the lock gear 144 is regulated. Additionally, when the vehicle sensor 16 is actuated, the sensor lever thereof engages with external teeth 144a of the lock gear 144, and the rotation of the lock gear 144 is regulated.

When the rotation of the lock gear 144 is regulated, the locking base 142 and the lock gear 144 are rotated relative to each other, and the pawl 141 swings along with this relative rotation to engage a tip of the pawl 141 with the internal teeth formed in the opening 122a of the base frame 12. As a result, rotation of the locking base 142 is regulated and rotation of the spool 11 is also regulated. Thus, the withdrawal of the webbing is locked.

It should be noted that, at normal time (when the acceleration speed of withdrawal of the webbing is equal to or less than a specified threshold value), the lock mechanism 14 is not actuated, and the locking base 142 and the lock gear 144 are rotated together along with the rotation of the spool 11. Thus, since the locking base 142 and the lock gear 144 are not rotated relative to each other at the normal time, the pawl 141 is maintained in a state of being retracted to a position where the pawl 141 does not interfere with the internal teeth formed in the opening 122a of the base frame 12.

The pretensioner 1 includes the ring gear 2, the power transmission unit 3, the pretensioner cover 4 for housing the ring gear 2, and a guide spacer 42 that is disposed in an inside of the pretensioner cover 4. The pretensioner cover 4 is disposed in an inside of an end surface 122 of the base frame 12. The passage of the power transmission member 31 is defined by an outer wall of the pretensioner cover 4. Additionally, the guide spacer 42 is formed with a projecting part 43 that forms a termination of the passage of the power transmission member 31. Furthermore, the ring gear 2 is disposed so as to be positioned between the pretensioner cover 4 and the inside of the end surface 122 of the base frame 12. It should be noted that the projecting part 43 that forms the termination of the passage may be formed on the pretensioner cover 4, or may be structured with another part having a high strength.

Since the pretensioner 1 illustrated in FIG. 4 is the pretensioner 1 according to the third embodiment described above, detailed description is omitted here. It should be noted that the pretensioner 1 according to the first embodiment or the second embodiment may be adopted as the pretensioner 1, and a same structure as that of a conventional retractor may appropriately be selected and adopted as a specific structure of the retractor 10.

Figure 5:
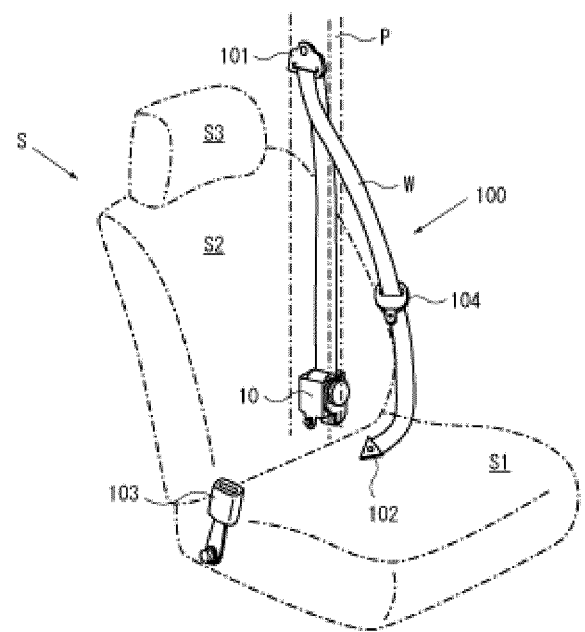
FIG. 5 illustrates an overall structure of a seat belt device according to the embodiments of the invention.

Next, a seat belt device according to the embodiment of the present invention is described with reference to FIG. 5. Here, FIG. 5 illustrates an overall structure of the seat belt device according to the embodiment of the invention. It should be noted that, for convenience of description, parts other than the seat belt device are indicated by dotted-chain lines in FIG. 5.

A seat belt device 100 according to the embodiment illustrated in FIG. 5 includes a webbing W for restraining an occupant, a retractor 10 for retracting the webbing W, a guide anchor 101 that is disposed on a vehicle body side and guides the webbing W, a belt anchor 102 for fixing the webbing W to the vehicle body side, a buckle 103 that is disposed on a side surface of a seat S, and a tongue 104 that is disposed in the webbing W. The retractor 10 has, for example, the structure illustrated in FIG. 4.

Components other than the retractor 10 are briefly described below. The seat S includes, for example, a seat portion S1 on which the occupant sits, a backrest portion S2 that is positioned back of the occupant, and a headrest portion S3 for supporting the head of the occupant. The retractor 10 is disposed, for example, in a B-pillar P of the vehicle body. In general, the buckle 103 is often disposed on a side surface of the seat portion S1, and the belt anchor 102 is often disposed on a lower surface of the seat portion S1. Furthermore, the guide anchor 101 is often disposed at the B-pillar P. Then, a first end of the webbing W is connected to the belt anchor 102, and a second end of the webbing W is connected to the retractor 10 via the guide anchor 101.

Accordingly, in order to fit the tongue 104 into the buckle 103, the webbing W is withdrawn from the retractor 10 while being slid through an insertion hole of the guide anchor 101. Furthermore, when the occupant fastens the seat belt or releases the seat belt to leave the vehicle, the webbing W is retracted due to operation of the spring unit 13 of the retractor 10 until a certain amount of load is applied to the webbing W.

The above-described seat belt device 100 is made by applying the retractor 10 according to the embodiment described above to a typical seat belt device for a front seat. The retractor 10 includes a pretensioner 1 according to any one of the first to third embodiments described above. Therefore, the seat belt device 100 according to the embodiment can effectively reduce the kinetic energy of an injected power transmission member 31, and the gas generator 33 can prevent the injected gas from being released to external environment.

The present invention is not limited to the above-described embodiment. Of course, the present invention can be changed in various manners without departing from the gist of the present invention. For example, the present invention may be applied to a seat belt device used for a conveyance other than the vehicle.

REFERENCE SIGNS LIST 1 pretensioner
2 ring gear 3 power transmission unit
4 pretensioner cover
9 rotating shaft
10 retractor
11 spool
12 base frame
13 spring unit
14 lock mechanism
15 retainer cover
16 vehicle sensor
21 external teeth
22 internal teeth
31 power transmission member
32 pipe
33 gas generator
34 piston
35 first stopper
36 second stopper
41 passage
42 guide spacer
43 projecting part
91 pinion gear
100 seat belt device
101 guide anchor
102 belt anchor
103 buckle
104 tongue
111 torsion bar
112 bearing
121, 122 end surface
121*a*, 122*a*, 122*b* opening
123 side surface
124 tie plate
141 pawl
142 locking base
142*a* disk part
142*b* ring-gear-supporting part
142*c* torsion-bar-supporting part
143 cover plate
144 lock gear
144*a* external teeth
145 flywheel

The invention claimed is:

1. A pretensioner comprising:
a ring gear to which a spool is rotatably disposed, the spool winding a webbing for restraining an occupant; and
a power transmission unit for transmitting power to the ring gear in an emergency, wherein
the power transmission unit includes a power transmission member that is a rod-shaped member and that is engageable with external teeth of the ring gear, a pipe that contains the power transmission member, a gas generator that is disposed at an end of the pipe, a piston that receives gas generated from the gas generator to press the power transmission member, a first stopper consisting of a tip part of the power transmission member, a second stopper that is a separate part from the power transmission member and the piston and is disposed therebetween the power transmission member and the piston, and a pretensioner cover that defines a passage for the power transmission member,
wherein the second stopper is adopted to be bitten by the external teeth of the ring gear to stop rotation of the ring gear, after the first stopper has reached the end of the passage and has absorbed at least some of the kinetic energy of the power transmission member.

2. A retractor comprising:
a spool for winding a webbing that restrains an occupant; and
a pretensioner for winding the webbing and eliminating slack in an emergency, wherein
the pretensioner is the pretensioner according to claim 1.

3. A seat belt device comprising:
a webbing for restraining an occupant;
a retractor for winding the webbing;
a belt anchor for fixing the webbing on a vehicle body side;
a buckle disposed on a side surface of a seat on which the occupant sits; and
a tongue disposed in the webbing, wherein
the retractor includes the pretensioner according to claim 1.

\* \* \* \* \*